(12) United States Patent
Wiedeman

(10) Patent No.: US 6,654,357 B1
(45) Date of Patent: **\*Nov. 25, 2003**

(54) SATELLITE REPEATER DIVERSITY RESOURCE MANAGEMENT SYSTEM

(75) Inventor: Robert A. Wiedeman, Los Altos, CA (US)

(73) Assignee: Globalstar L.P., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/104,712

(22) Filed: Jun. 25, 1998

Related U.S. Application Data

(63) Continuation of application No. 08/843,967, filed on Apr. 17, 1997, now Pat. No. 5,867,109, and a continuation of application No. 08/463,520, filed on Jun. 6, 1995, now abandoned.

(51) Int. Cl.[7] .................................................. H04Q 7/38
(52) U.S. Cl. ........................ 370/315; 370/316; 455/13.1
(58) Field of Search ................................. 370/315, 328, 370/18, 316; 375/267, 137, 211; 455/13.1, 13.3, 13.4; 340/7.2

(56) References Cited

U.S. PATENT DOCUMENTS

| | | | |
|---|---|---|---|
| RE32,905 E | 4/1989 | Baran ......................... | 370/104 |
| 4,901,307 A | 2/1990 | Gilhousen et al. ............ | 370/18 |
| 4,912,656 A | 3/1990 | Cain et al. ................... | 364/514 |
| 5,010,317 A | 4/1991 | Schwendeman et al. . | 340/311.1 |
| 5,073,900 A | 12/1991 | Mallinckrodt .................. | 375/1 |
| 5,081,703 A | 1/1992 | Lee .............................. | 455/13 |
| 5,109,390 A | 4/1992 | Gilhousen et al. ............. | 375/1 |
| 5,119,225 A | 6/1992 | Grant et al. ................. | 359/172 |
| 5,216,427 A | 6/1993 | Yan et al. .................... | 342/352 |
| 5,233,626 A | 8/1993 | Ames ........................... | 375/1 |

(List continued on next page.)

FOREIGN PATENT DOCUMENTS

| | | |
|---|---|---|
| EP | 0 406 905 A2 | 1/1991 |
| EP | 0 421 698 A3 | 10/1991 |
| EP | 0 536 033 A2 | 4/1993 |
| EP | 0 536 921 A1 | 4/1993 |
| GB | 2 279 842 A | 1/1995 |
| WO | WO 90/10341 | 9/1990 |
| WO | WO 90/13186 | 11/1990 |
| WO | WO 91/09473 | 6/1991 |

OTHER PUBLICATIONS

US 5,415,368, 5/1995, Horstein et al. (withdrawn)

B.R. Vojcic et al., The Effect of Dual Satellite Diversity on the Total Capacity of Multiple Band–Shared CDMA LEOS Systems, IEEE 1994, pp. 1141–1144.

(List continued on next page.)

*Primary Examiner*—Edwin C. Holloway, III
(74) *Attorney, Agent, or Firm*—Ohlandt, Greeley, Ruggiero & Perle, L.L.P.

(57) ABSTRACT

A satellite communications system (10) has a controller for improving and optimizing the delivery of path diversity in a satellite repeater-based communication system, thereby conserving both FDM channels and satellite power utilization. The reception of communications is improved, when one or more orbiting satellite repeater (12) transmitters is blocked or severely faded, by recognizing the need for satellite path diversity on a real-time or near real-time basis. A user terminal (13) is thus enabled to receive sufficient signal strength to avoid having an ongoing call automatically terminated. The system optimizes satellite path diversity applied to (a) classes (types) of user terminals and/or (b) to individual user terminals as a function of location and also a local RF propagation environment of the user terminal. In addition, a consideration is made of the satellite resources that are available at any given point in time, and may restrict or limit the availability of satellite path diversity, thereby increasing overall system capacity.

22 Claims, 11 Drawing Sheets

U.S. PATENT DOCUMENTS

| | | | |
|---|---|---|---|
| 5,239,671 A | 8/1993 | Linquist et al. | 455/13.1 |
| 5,303,286 A | 4/1994 | Wiedeman | 379/59 |
| 5,339,330 A | 8/1994 | Mallinckrodt | 375/1 |
| 5,410,728 A | 4/1995 | Bertiger et al. | 455/13.1 |
| 5,422,647 A | 6/1995 | Hirshfield et al. | 342/354 |
| 5,433,726 A | 7/1995 | Horstein et al. | 244/158 R |
| 5,439,190 A | 8/1995 | Horstein et al. | 244/158 |
| 5,446,756 A | 8/1995 | Mallinckrodt | 375/200 |
| 5,448,623 A | 9/1995 | Wiedeman et al. | 379/59 |

OTHER PUBLICATIONS

P. Jung et al., "Inter–Satellite Links For Personal Communications Low Earth Orbit Satellite Systems", Feb. 11, 1993, pp. 246–250.

"The OmniTRACS Mobile Saellite Communications and Positioning System", Edward G. Tiedemann, Jr., et al.. Vehicle Electronics in the 90's: Proceedings of the International Congress on Transportation Electronics P–233, Oct. 1990.

Petition of American Mobile Satellite Corporation Before the FCC, Washington, DC 20554, dated Jun. 3, 1991, pp 1–15.

Application of Motorola Satellite Communications, Inc. for IRIDIUM A Low Earth Orbit Mobile Satellite System before the FCC, Washington, D.C. Dec. 1990, pp. 49–96.

Before the FCC, Washington, D.C. 20554, ARIES CONSTELLATION Low Earth Orbit Satellite System Proposal of Constellation Communications, Inc. Jun. 3, 1991, Appendix A, B, and C.

Application of TRW Inc. for Authority to Construct a New Communications Satellite SYSTEM ODYSSEY[SM] before the FCC, Washington, D.C. 20554, May 31, 1991 pp. 33–51.

Application of Ellipsat Corporation ELLIPSAT for the Authority to Construct ELLIPSO ® I An Elliptical Orbit Satellite System, before the FCC, Washington, D.C. 20554, Nov. 2, 1990, pp. 5–34.

Application of Loral Cellular Systems, Corp., Globalstar Mobile COmmunications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, italy, Sep. 21, 1989.

"Current and Future Mobile Satellite Communication Systems", S. Kato et al., IEICE Transactions, vol. E 74, No. 8 Aug. 1991, pp. 2201–2210.

"Digital Network Oriented Mobile Radio Satellite System as an Integrated Part of the GSM Cellular Radio System in Europe", P. Dondl, Deutsch BUndespost/Fernmeldetechniches Zentralmt/Darmstadt, Fed. Rep. Germ. Sep. 21, 1989.

"The OmniTRACS Mobile Satellite Communications and Positioning System", E. Tiedemann, Jr. et al., Vehicle Electronics in the 90's: Proceedings of the In'l. Congress on Transporation Electronics, 10/90.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Commnunications, vol. 8, No. 4, May 1990, pp. 503–514.

"The Iridium ™[1] System—A Revolutionary Satellite Communications System Developed with Innovative Applications of Technology", D. Sterling, et al., IEEE, MILCOM 1991, Nov. 4–7.

"Iridium: Key to Worldwide Cellular Communications", J. Foley, Telecommunications, Oct. 1991, pp. 23–38.

SATELLITE REPEATER DIVERSITY RESOURCE MANAGEMENT SYSTEM

The present application is a continuation of U.S. patent application Ser. No. 08/843,967, filed Apr. 17, 1997, and issued as U.S. Pat. No. 5,867,109. The '967 application is a continuation of U.S. patent application Ser. No. 08/463,520, filed Jun. 6, 1995 (abandoned).

FIELD OF THE INVENTION

BACKGROUND OF THE INVENTION

Signal blocking and fading in mobile communications systems is well known. Satellite-based systems generally have more stringent requirements that terrestrial-based systems due to the significantly longer propagation paths. In satellite mobile communications systems blocking and fading of user terminals by buildings, trees and terrain can be mitigated by using multiple orbiting satellite repeater transmitters to send multiple copies of a signal, via some or all satellite repeater transmitters in view, to a user which is potentially experiencing signal blocking and fading. These mitigation techniques, especially those using spread spectrum systems, utilize multiple signal path diversity (hereinafter referred to simply as "path diversity") as a means of maintaining communication paths when individual mobile users are in blocking and fading situations. Low Earth Orbit (LEO) satellite communication systems in particular can exploit path diversity since there are multiple satellites and, hence, multiple and different communication paths to and from the user.

Most known or proposed systems of this type, in addition to using Code Division Multiple Access (CDMA), generally channelize by frequency division multiplex (FDM). Furthermore, providing path diversity has an adverse affect of requiring the system to utilize many satellites. This increases the total power demand for each satellite, and also requires each satellite to make the same RF channels available for each user for path diversity transmissions. The end result can be a reduction in the total capacity of the system due to inefficiencies in RF channel assignment.

One approach to providing path diversity is to provide path diversity indiscriminately to all users. In fact, however, the inventor has realized that there are many different types of user terminals, as well as many different types of communication environments that a given user may reside in, either temporarily or permanently. For example, certain users will employ vehicle mounted terminals which can move through the environment rather quickly. Other users may employ hand-held or fixed terminals which may not be moving at all. In addition, there are a variety of terrains wherein users can be located, such as oceans, deserts, forests, suburban, urban, rural farmland, etc.

It can be appreciated that not all communication environments require the same level of path diversity, and furthermore not all user terminals within a given environment require the same level of path diversity.

SUMMARY OF THE INVENTION

The foregoing and other problems are overcome by a satellite communications system that is constructed and operated in accordance with this invention.

Methods and apparatus are disclosed for improving and optimizing the delivery of path diversity in a satellite repeater-based communication system, thereby conserving both FDM channels and satellite power utilization. The reception of multiple signals is improved, when one or more orbiting satellite repeater (12) transmitters is blocked or severely faded, by recognizing the need for satellite path diversity on a real-time or near real-time basis. Thus, a user terminal (13) is enabled to receive sufficient signal strength to avoid having an ongoing communication automatically terminated by the optimization of path diversity (formed by multiple wireless links) that is applied to (a) classes (types) of user terminals and/or (b) to individual user terminals as a function of location and also a local RF propagation environment of the user terminal. In addition, the invention teaches a consideration of the satellite resources that are available at any given point in time, and may restrict or limit the availability of satellite path diversity, thereby increasing overall system capacity.

Also, a particular user may be found to have a historical record or "signature" of operating within a certain environment. The historical record can be utilized to optimize the user's typical usage, thereby further refining the potential for gaining higher system operating efficiency.

This invention teaches a method for operating a satellite communication system that includes the steps of (a) initiating a communication between a user terminal and a ground station via at least one satellite communication signal repeater; (b) classifying the user terminal as to type and/or determining a location of the user terminal within a service coverage area of the ground station; and (c) selecting a number of satellite communication signal repeaters to relay the communication between the user terminal and the ground station, the selected number being a function of at least the type and/or location of the user terminal and other characteristics, which may be stored within a database. The step of selecting can include a step of determining an RF energy propagation characteristic that is associated with the determined location of the user terminal. The use of a service area RF propagation map is disclosed for this purpose, the map being derived from, by example, satellite images of the natural and man-made features within the service area. The step of selecting can also include a step of considering a power control history of the user terminal. This is useful in distinguishing, by example, a mobile-type user terminal that is in motion from a mobile-type user terminal that happens to be stationary. The step of selecting may also include a step of considering a current availability of satellite communication signal RF channels within satellite repeaters and the physical circuit loading of the RF channels and satellite repeaters.

In a presently preferred embodiment of this invention the communication is relayed as a spread spectrum, code division multiple access communication signal between the user terminal and the ground station. In this case the method includes the additional steps of (d) receiving the communication with the user terminal, wherein the communication is received through different communication paths associated with individual ones of the selected number of satellite communication signal repeaters; (e) equalizing at least the phase shifts and time delays of the received communication from each of the different paths to provide a plurality of equalized communication signals; and (f) combining the equalized communication signals into a composite received communication signal.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
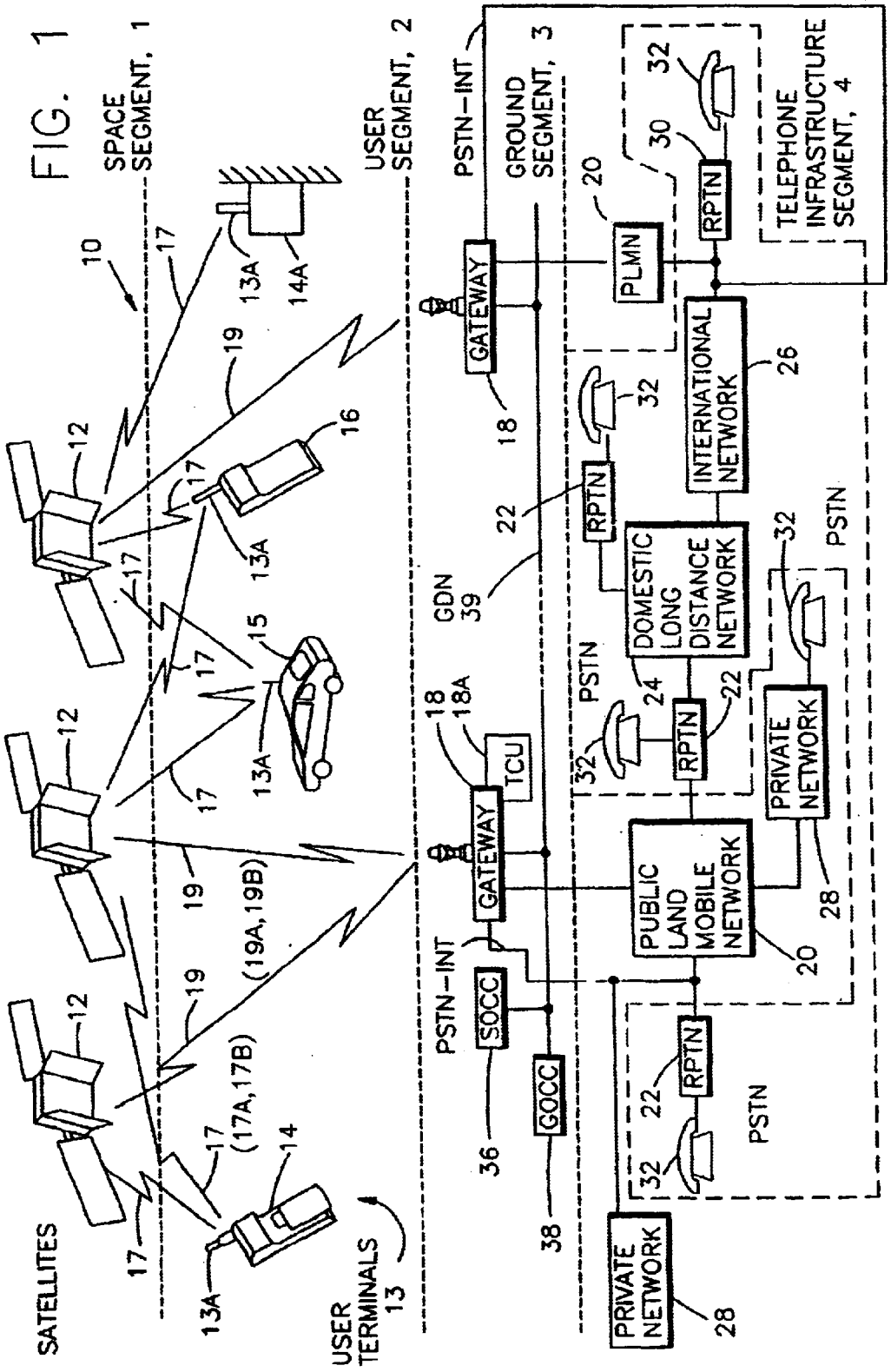
FIG. 1 is block diagram of a satellite communication system that is constructed and operated in accordance with a presently preferred embodiment of this invention.

FIG. 1 illustrates a presently preferred embodiment of a satellite communication system 10 that is suitable for use with the presently preferred embodiment of this invention. Before describing this invention in detail, a description will first be made of the communication system 10 so that a more complete understanding may be had of the present invention.

The communications system 10 may be conceptually sub-divided into a plurality of segments 1, 2, 3 and 4. Segment 1 is referred to herein as a space segment, segment 2 as a user segment, segment 3 as a ground (terrestrial) segment, and segment 4 as a telephone system infrastructure segment.

In the presently preferred embodiment of this invention there are a total of 48 satellites in, by example, a 1414 km Low Earth Orbit (LEO). The satellites 12 are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, a user is enabled to communicate to or from nearly any point on the earth's surface within a gateway (GW) 18 coverage area to or from other points on the earth's surface (by way of the PSTN), via one or more gateways 18 and one or more of the satellites 12, possibly also using a portion of the telephone infrastructure segment 4.

It is noted at this point that the foregoing and ensuing description of the system 10 represents but one suitable embodiment of a communication system within which the teaching of this invention may find use. That is, the specific details of the communication system are not to be read or construed in a limiting sense upon the practice of this invention.

Continuing now with a description of the system 10, a soft transfer (handoff) process between satellites 12, and also between individual ones of 16 spot beams transmitted by each satellite (FIG. 3B), provides unbroken communications via a spread spectrum (SS), code division multiple access (CDMA) technique. The presently preferred SS-CDMA technique is similar to the TIA/EIA Interim Standard, "Mobile Station-Base Station Compatibility Standard for Dual-Mode Wideband Spread Spectrum Cellular System" TIA/EIA/IS-95, July 1993, although other spread spectrum and CDMA techniques and protocols can be employed.

The low earth orbits permit low-powered fixed or mobile user terminals 13 to communicate via the satellites 12, each of which functions, in a presently preferred embodiment of this invention, solely as a "bent pipe" repeater to receive a communications traffic signal (such as speech and/or data) from a user terminal 13 or from a gateway 18, convert the received communications traffic signal to another frequency band, and to then re-transmit the converted signal. That is, no on-board signal processing of a received communications traffic signal occurs, and the satellite 12 does not become aware of any intelligence that a received or transmitted communications traffic signal may be conveying.

Furthermore, there need be no direct communication link or links between the satellites 12. That is, each of the satellites 12 receives a signal only from a transmitter located in the user segment 2 or from a transmitter located in the ground segment 3, and transmits a signal only to a receiver located in the user segment 2 or to a receiver located in the ground segment 3.

The user segment 2 may include a plurality of types of user terminals 13 that are adapted for communication with the satellites 12. The user terminals 13 include, by example, a plurality of different types of fixed and mobile user terminals including, but not limited to, handheld mobile radio-telephones 14, vehicle mounted mobile radio-telephones 15, paging/messaging-type devices 16, and fixed radio-telephones 14a. The user terminals 13 are preferably provided with omnidirectional antennas 13a for bidirectional communication via one or more of the satellites 12.

It is noted that the fixed radio-telephones 14a may employ a directional antenna. This is advantageous in that it enables a reduction in interference with a consequent increase in the number of users that can be simultaneously serviced with one or more of the satellites 12.

It is further noted that the user terminals 13 may be dual use devices that include circuitry for also communicating in a conventional manner with a terrestrial cellular system.

Figure 3A:
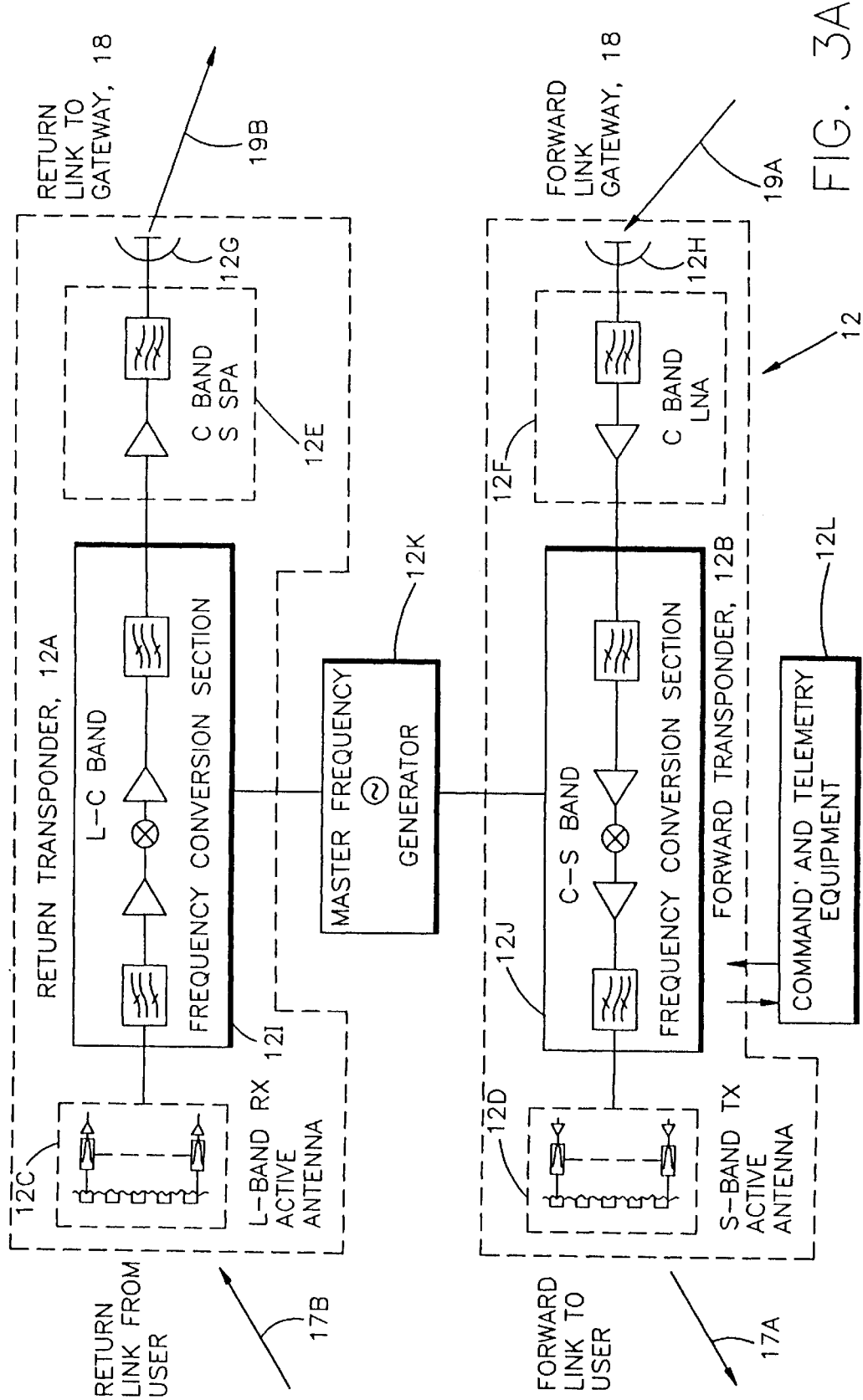
FIG. 3A is a block diagram of the communications payload of one of the satellites of FIG. 1.

Referring also to FIG. 3A, the user terminals 13 may be capable of operating in a full duplex mode and communicate via, by example, L-band RF links (uplink or return link 17b) and S-band RF links (downlink or forward link 17a) through return and forward satellite transponders 12a and 12b, respectively. The return L band RF links 17b may operate within a frequency range of 1.61 GHz to 1.625 GHz, a bandwidth of 16.5 MHz, and are modulated with packetized digital voice signals and/or data signals in accordance with the preferred spread spectrum technique. The forward S band RF links 17a may operate within a frequency range of 2.485 GHz to 2.5 GHz, a bandwidth of 16.5 MHz. The forward RF links 17a are also modulated at a gateway 18 with packetized digital voice signals and/or data signals in accordance with the spread spectrum technique.

The 16.5 MHz bandwidth of the forward link is partitioned into 13 channels with up to, by example, 128 users being assigned per channel. The return link may have various bandwidths, and a given user terminal 13 may or may not be assigned a different channel than the channel assigned on the forward link. However, when operating in the diversity reception mode on the return link (receiving from two or more satellites 12), the user is assigned the same forward and return link RF channel for each of the satellites.

The ground segment 3 includes at least one but generally a plurality of the gateways 18 that communicate with the satellites 12 via, by example, a full duplex C band RF link 19 (forward link 19a (to the satellite), return link 19b (from the satellite)) that operates within a range of frequencies generally above 3 GHz and preferably in the C-band. The C-band RF links bi-directionally convey the communication feeder links, and also convey satellite commands to the satellites and telemetry information from the satellites. The forward feeder link 19a may operate in the band of 5 GHz to 5.25 GHz, while the return feeder link 19b may operate in the band of 6.875 GHz to 7.075 GHz.

The satellite feeder link antennas 12g and 12h are preferably wide coverage antennas that subtend a maximum earth coverage area as seen from the LEO satellite 12. In the presently preferred embodiment of the communication system 10 the angle subtended from a given LEO satellite 12 (assuming 10° elevation angles from the earth's surface) is approximately 110°. This yields a coverage zone that is approximately 3600 miles in diameter.

Figure 3B:
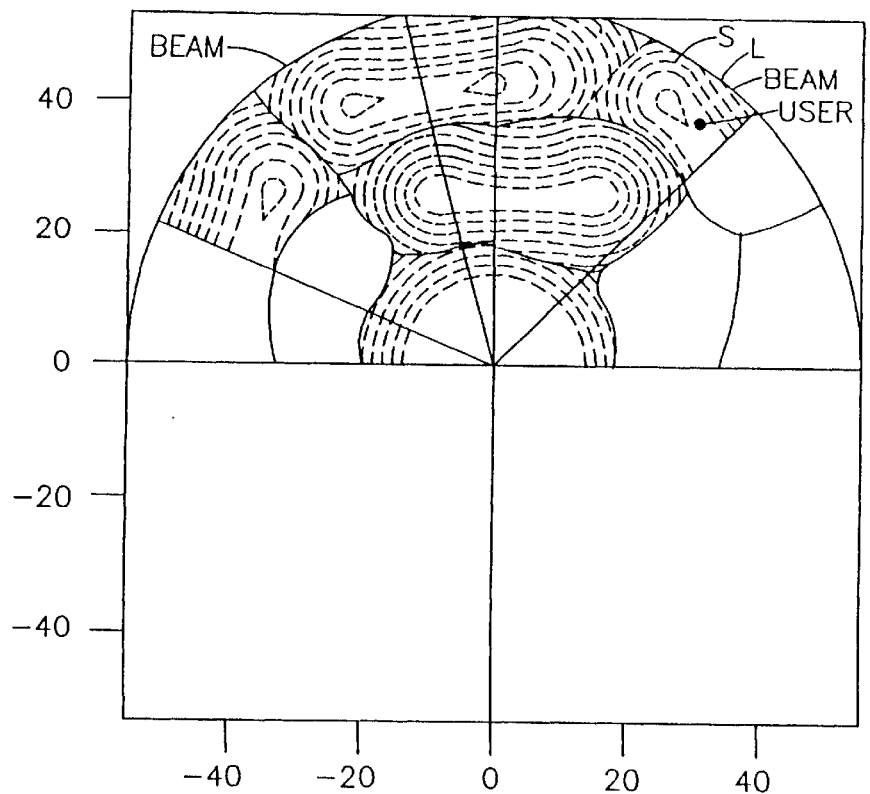
FIG. 3B illustrates a portion of a beam pattern that is associated with one of the satellites of FIG. 1.

The L-band and the S-band antennas are multiple beam antennas that provide coverage within an associated terrestrial service region. The L-band and S-band antennas 12d and 12c, respectively, are preferably congruent with one another, as depicted in FIG. 3B. That is, the transmit and receive beams from the spacecraft cover the same area on the earth's surface, although this feature is not critical to the operation of the system 10.

As an example, several thousand full duplex communications may occur through a given one of the satellites 12. In accordance with a feature of the system 10, two or more satellites 12 may each convey the same communication between a given user terminal 13 and one of the gateways 18. This mode of operation, as described in detail below, thus provides for diversity combining at the respective receivers, leading to an increased resistance to fading and facilitating the implementation of a soft handoff procedure.

It is pointed out that all of the frequencies, bandwidths and the like that are described herein are representative of but one particular system. Other frequencies and bands of frequencies may be used with no change in the principles being discussed. As but one example, the feeder links between the gateways and the satellites may use frequencies in a band other than the C-band (approximately 3 GHz to approximately 7 GHz), for example the Ku band (approximately 10 GHz to approximately 15 GHz) or the Ka band (above approximately 15 GHz).

The gateways 18 function to couple the communications payload or transponders 12a and 12b (FIG. 3A) of the satellites 12 to the telephone infrastructure segment 4. The transponders 12a and 12b include an L-band receive antenna 12c, S-band transmit antenna 12d, C-band power amplifier 12e, C-band low noise amplifier 12f, C-band antennas 12g and 12h, L band to C band frequency conversion section 12i, and C band to S band frequency conversion section 12j. The satellite 12 also includes a master frequency generator 12k and command and telemetry equipment 12l.

Reference in this regard may also be had to U.S. Pat. No. 5,422,647, by E. Hirshfield and C. A. Tsao, entitled "Mobile Communications Satellite Payload" Ser. No. 08/060,207).

The telephone infrastructure segment 4 is comprised of existing telephone systems and includes Public Land Mobile Network (PLMN) gateways 20, local telephone exchanges such as regional public telephone networks (RPTN) 22 or other local telephone service providers, domestic long distance networks 24, international networks 26, private networks 28 and other RPTNs 30. The communication system 10 operates to provide bidirectional voice and/or data communication between the user segment 2 and Public Switched Telephone Network (PSTN) telephones 32 and non-PSTN telephones 32 of the telephone infrastructure segment 4, or other user terminals of various types, which may be private networks.

Also shown in FIG. 1 (and also in FIG. 4), as a portion of the ground segment 3, is a Satellite Operations Control Center (SOCC) 36, and a Ground Operations Control Center (GOCC) 38. A communication path, which includes a Ground Data Network (GDN) 39 (see FIG. 2), is provided for interconnecting the gateways 18 and TCUs 18a, SOCC 36 and GOCC 38 of the ground segment 3. This portion of the communications system 10 provides overall system control functions.

Figure 2:
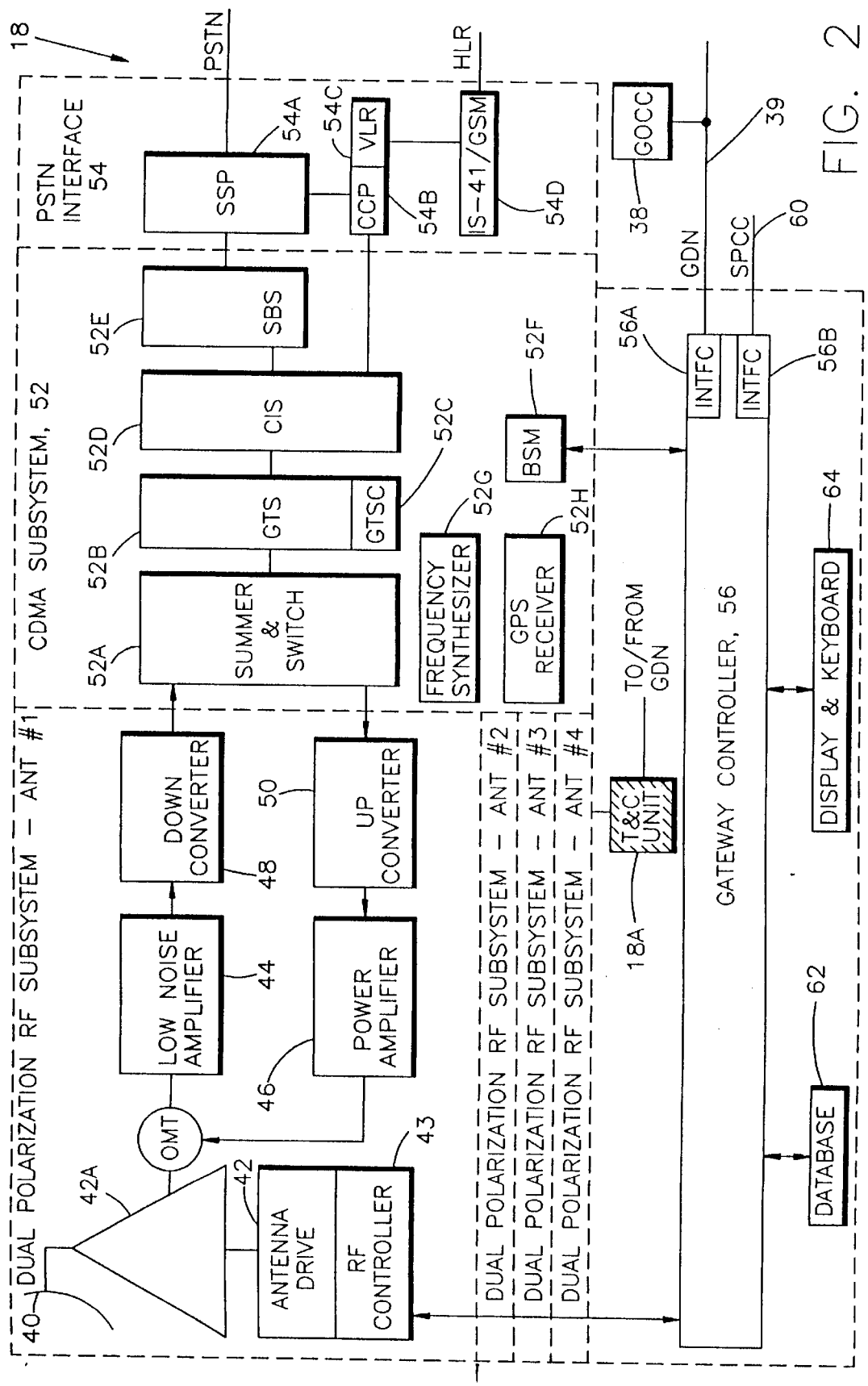
FIG. 2 is a block diagram of one of the gateways of FIG. 1.

FIG. 2 shows one of the gateways 18 in greater detail. Each gateway 18 includes up to four dual polarization RF C-band sub-systems each comprising a dish antenna 40, antenna driver 42 and pedestal 42a, low noise receivers 44, and high power amplifiers 46. All of these components may be located within a radome structure to provide environmental protection.

The gateway 18 further includes down converters 48 and up converters 50 for processing the received and transmitted RF carrier signals, respectively. The down converters 48 and the up converters 50 are connected to a CDMA sub-system 52 which, in turn, is coupled to the Public Switched Telephone Network (PSTN) though a PSTN interface 54. As an option, the PSTN could be bypassed by using satellite-to-satellite links.

The CDMA sub-system 52 includes a signal summer/switch unit 52a, a Gateway Transceiver Subsystem (GTS) 52b, a GTS Controller 52c, a CDMA Interconnect Subsystem (CIS) 52d, and a Selector Bank Subsystem (SBS) 52e. The CDMA sub-system 52 is controlled by a Base Station Manager (BSM) 52f and functions in a manner similar to a CDMA-compatible (for example, an IS-95 compatible) base station. The CDMA sub-system 52 also includes the required frequency synthesizer 52g and a Global Positioning System (GPS) receiver 52h.

The PSTN interface 54 includes a PSTN Service Switch Point (SSP) 54a, a Call Control Processor (CCP) 54b, a Visitor Location Register (VLR) 54c, and a protocol interface 54d to a Home Location Register (HLR). The HLR may be located in the cellular gateway 20 (FIG. 1) or, optionally, in the PSTN interface 54.

The gateway 18 is connected to telecommunication networks through a standard interface made through the SSP 54a. The gateway 18 provides an interface, and connects to the PSTN via Primary Rate Interface (PRI). The gateway 18 is further capable of providing a direct connection to a Mobile Switching Center (MSC).

The gateway 18 provides SS-7 ISDN fixed signalling to the CCP 54b. On the gateway-side of this interface, the CCP 54b interfaces with the CIS 52d and hence to the CDMA subsystem 52. The CCP 54b provides protocol translation functions for the system Air Interface (AI), which may be similar to the IS-95 Interim Standard for CDMA communications.

Blocks 54c and 54d generally provide an interface between the gateway 18 and an external cellular telephone network that is compatible, for example, with the IS-41 (North American Standard, AMPS) or the GSM (European Standard, MAP) cellular systems and, in particular, to the specified methods for handling roamers, that is, users who place calls outside of their home system. The gateway 18 supports user terminal authentication for system 10/AMPS phones and for system 10/GSM phones. In service areas where there is no existing telecommunications infrastructure, an HLR can be added to the gateway 18 and interfaced with the SS-7 signalling interface.

A user making a call out of the user's normal service area (a roamer) is accommodated by the system 10 if authorized. In that a roamer may be found in any environment, a user may employ the same terminal equipment to make a call from anywhere in the world, and the necessary protocol conversions are made transparently by the gateway 18. The protocol interface 54d is bypassed when not required to convert, by example, GSM to AMPS.

It is within the scope of the teaching of this invention to provide a dedicated, universal interface to the cellular gateways 20, in addition to or in place of the conventional "A" interface specified for GSM mobile switching centers and vendor-proprietary interfaces to IS-41 mobile switching centers. It is further within the scope of this invention to provide an interface directly to the PSTN, as indicated in FIG. 1 as the signal path designated PSTN-INT.

Overall gateway control is provided by the gateway controller 56 which includes an interface 56a to the above-mentioned Ground Data Network (GDN) 39 and an interface 56b to a Service Provider Control Center (SPCC) 60. The gateway controller 56 is generally interconnected to the gateway 18 through the BSM 52f and through RF controllers 43 associated with each of the antennas 40. The gateway controller 56 is further coupled to a database 62, such as a database of users, satellite ephemeris data, etc., and to an I/O unit 64 that enables service personnel to gain access to the gateway controller 56. The GDN 39 is also bidirectionally interfaced to a Telemetry and Command (T&C) unit 66 (FIGS. 1 and 4).

Figure 4:
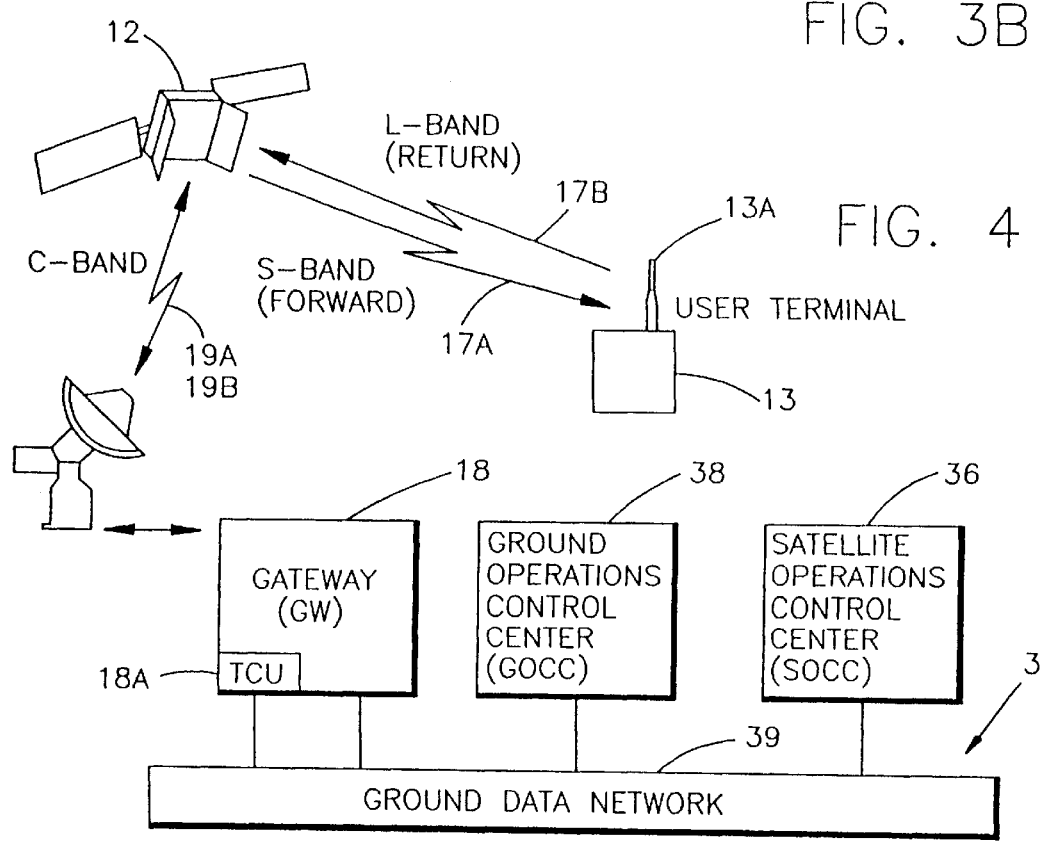
FIG. 4 is a block diagram that depicts the ground equipment support of satellite telemetry and control functions.

Referring to FIG. 4, the function of the GOCC 38 is to plan and control satellite utilization by the gateways 18, and to coordinate this utilization with the SOCC 36. In general, the GOCC 38 analyses trends, generates traffic plans, allocates satellite 12 and system resources (such as, but not limited to, power and channel allocations), monitors the performance of the overall system 10, and issues utilization instructions, via the GDN 39, to the gateways 18 in real time or in advance.

The SOCC 36 operates to maintain and monitor orbits, to relay satellite usage information to the gateway for input to the GOCC 38 via the GDN 39, to monitor the overall functioning of each satellite 12, including the state of the satellite batteries, to set the gain for the RF signal paths within the satellite 12, to ensure optimum satellite orientation with respect to the surface of the earth, in addition to other functions.

As described above, each gateway 18 functions to connect a given user to the PSTN for both signalling, voice and/or data communications and also to generate data, via database 62 (FIG. 2), for billing purposes. Selected gateways 18 include a Telemetry and Command Unit (TCU) 18a for receiving telemetry data that is transmitted by the satellites 12 over the return link 19b and for transmitting commands up to the satellites 12 via the forward link 19a. The GDN 39 operates to interconnect the gateways 18, GOCC 38 and the SOCC 36.

In general, each satellite 12 of the LEO constellation operates to relay information from the gateways 18 to the users (C band forward link 19a to S band forward link 17a), and to relay information from the users to the gateways 18 (L band return link 17b to C band return link 19b). This information includes SS-CDMA synchronization and paging channels, in addition to power control signals. Various CDMA pilot channels may also be used to monitor interference on the forward link. Satellite ephemeris update data is also communicated to each of the user terminals 13, from the gateway 18, via the satellites 12.

The satellites 12 also function to relay signalling information from the user terminals 13 to the gateway 18, including access requests, power change requests, and registration requests. The satellites 12 also relay communication signals between the users and the gateways 18, and may apply security to mitigate unauthorized use.

In operation, the satellites 12 transmit spacecraft telemetry data that includes measurements of satellite operational status. The telemetry stream from the satellites, the commands from the SOCC 36, and the communications feeder links 19 all share the C band antennas 12g and 12h. For those gateways 18 that include a TCU 18a the received satellite telemetry data may be forwarded immediately to the SOCC 36, or the telemetry data may be stored and subsequently forwarded to the SOCC 36 at a later time, typically upon SOCC request. The telemetry data, whether transmitted immediately or stored and subsequently forwarded, is sent over the GDN 39 as packet messages, each packet message containing a single minor telemetry frame. Should more than one SOCC 36 be providing satellite support, the telemetry data is routed to all of the SOCCs.

The SOCC 36 has several interface functions with the GOCC 38. One interface function is orbit position information, wherein the SOCC 36 provides orbital information to the GOCC 38 such that each gateway 18 can accurately track up to four satellites that may be in view of the gateway. This data includes data tables that are sufficient to allow the gateways 18 to develop their own satellite contact lists, using known algorithms. The SOCC 36 is not required to known the gateway tracking schedules. The TCU 18a searches the downlink telemetry band and uniquely identifies the satellite being tracked by each antenna prior to the propagation of commands.

Another interface function is satellite status information that is reported from the SOCC 36 to the GOCC 38. The satellite status information includes both satellite/transponder availability, battery status and orbital information and incorporates, in general, any satellite-related limitations that would preclude the use of all or a portion of a satellite 12 for communications purposes.

An important aspect of the system 10 is the use of SS-CDMA in conjunction with diversity combining at the gateway receivers and at the user terminal receivers. Diversity combining is employed to mitigate the effects of fading as signals arrive at the user terminals 13 or the gateway 18 from multiple satellites over multiple and different path lengths. Rake receivers in the user terminals 13 and the gateways 18 are employed to receive and combine the signals from multiple sources. As an example, a user terminal 13 or the gateway 18 provides diversity combining for the forward link signals or the return link signals that are simultaneously received from and transmitted through the multiple beams of the satellites 12.

In this regard the disclosure of U.S. Pat. No. 5,233,626, issued Aug. 3, 1993 to Stephen A. Ames and entitled "Repeater Diversity Spread Spectrum Communication System", is incorporated by reference herein in its entirety.

The performance in the continuous diversity reception mode is superior to that of receiving one signal through one satellite repeater, and furthermore there is no break in communications should one link be lost due to shadowing or blockage from trees or other obstructions that have an adverse impact on the received signal.

The multiple, directional, antennas 40 of a given one of the gateways 18 are capable of transmitting the forward link signal (gateway to user terminal) through different beams of one or more satellites 12 to support diversity combining in the user terminals 13. The omnidirectional antennas 13a of the user terminals 13 transmit through all satellite beams that can be "seen" from the user terminal 13.

Each gateway 18 supports a transmitter power control function to address slow fades, and also supports block interleaving to address medium to fast fades. Power control is implemented on both the forward and reverse links. The response time of the power control function is adjusted to accommodate for a worst case 30 msec satellite round trip delay.

The block interleavers (53d, 53e, 53f, FIG. 5) operate over a block length that is related to vocoder 53g packet frames. An optimum interleaver length trades off a longer length, and hence improved error correction, at the expense of increasing the overall end-to-end delay. A preferred maximum end-to-end delay is 150 msec or less. This delay includes all delays including those due to the received signal alignment performed by the diversity combiners, vocoder 53g processing delays, block interleaver 53d–53f delays, and the delays of the Viterbi decoders (not shown) that form a portion of the CDMA sub-system 52.

Figure 5:
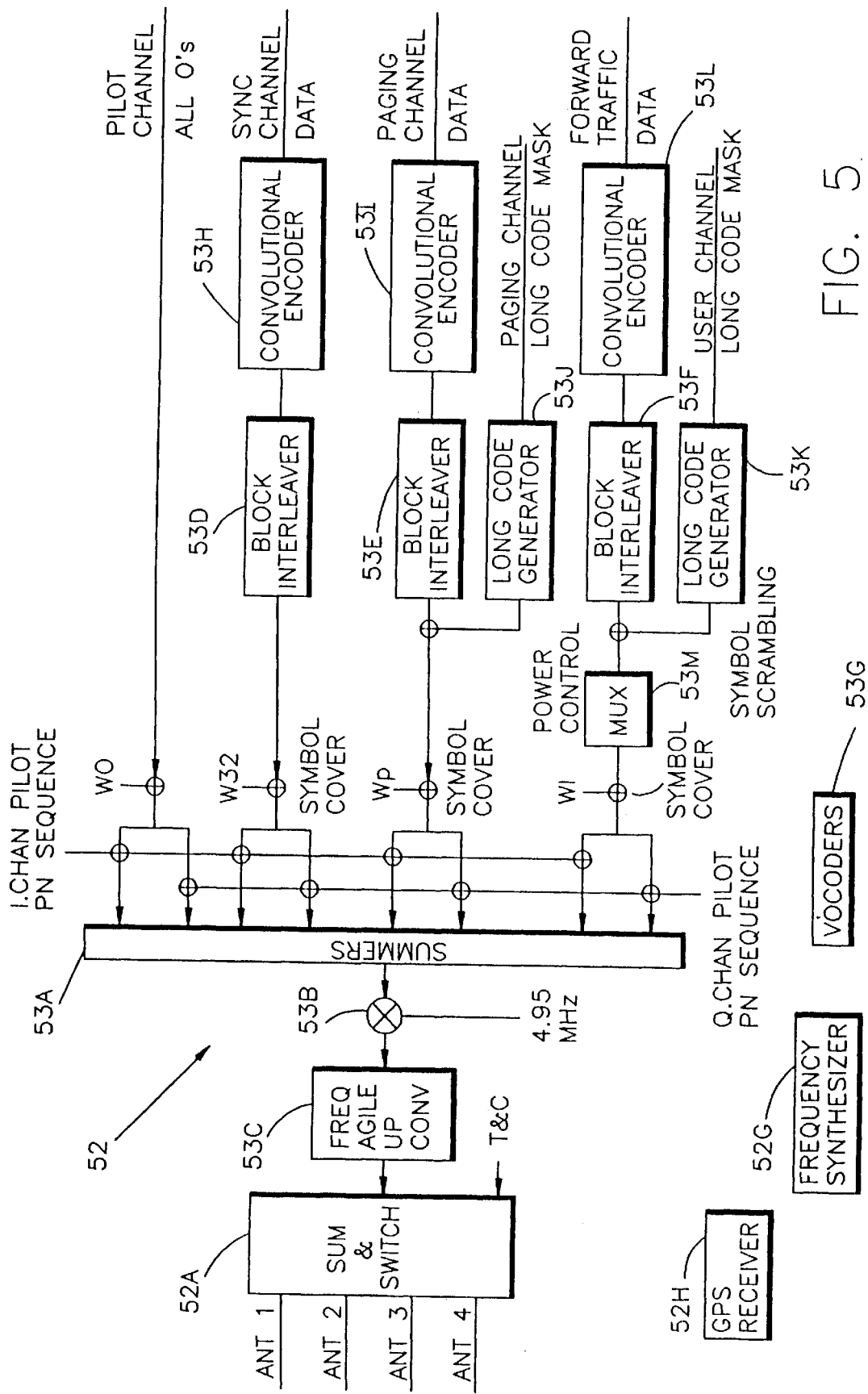
FIG. 5 is block diagram of the CDMA sub-system of FIG. 2.

FIG. 5 is a block diagram of the forward link modulation portion of the CDMA sub-system 52 of FIG. 2. An output of a summer block 53a feeds a frequency agile up-converter 53b which in turn feeds the summer and switch block 52a. The telemetry and control (T&C) information is also input to the block 52a.

An unmodulated direct sequence SS pilot channel generates an all zeros Walsh Code at a desired bit rate. This data stream is combined with a short PN code that is used to separate signals from different gateways 18 and different satellites 12. If used, the pilot channel is modulo 2 added to the short code and is then QPSK or BPSK spread across the CDMA FD RF channel bandwidth. The following different pseudonoise (PN) code offsets are provided: (a) a PN code offset to allow a user terminal 13 to uniquely identify a gateway 18; (b) a PN code offset to allow the user terminal 13 to uniquely identify a satellite 12; and (c) a PN code offset to allow the user terminal 13 to uniquely identify a given one of the 16 beams that is transmitted from the satellite 12. Pilot PN codes from different ones of the satellites 12 are assigned different time/phase offsets from the same pilot seed PN code.

If used, each pilot channel that is transmitted by the gateway 18 may be transmitted at a higher or lower power level than the other signals. A pilot channel enables a user terminal 13 to acquire the timing of the forward CDMA channel, provides a phase reference for coherent demodulation, and provides a mechanism to perform signal strength comparisons to determine when to initiate handoff. The use of the pilot channel is not, however, mandatory, and other techniques can be employed for this purpose.

The Sync channel generates a data stream that includes the following information: (a) time of day; (b) transmitting gateway identification; (c) satellite ephemeris; and (d) assigned paging channel. The Sync data is applied to a convolution encoder 53h where the data is convolutionally encoded and subsequently block interleaved to combat fast fades. The resulting data stream is modulo two added to the synchronous Walsh code and QPSK or BPSK spread across the CDMA FD RF channel bandwidth.

The Paging channel is applied to a convolutional encoder 53i where it is convolutionally encoded and is then block interleaved. The resulting data stream is combined with the output of a long code generator 53j. The long PN code is used to separate different user terminal 13 bands. The paging channel and the long code are modulo two added and provided to a symbol cover where the resulting signal is modulo two added to the Walsh Code. The result is then QPSK or BPSK spread across the CDMA FD RF channel bandwidth.

In general, the paging channel conveys several message types which include: (a) a system parameter message; (b) an access parameter message; and (c) a CDMA channel list message.

The system parameter message includes the configuration of the paging channel, registration parameters, and parameters to aid in acquisition. The access parameters message includes the configuration of the access channel and the access channel data rate. The CDMA channel list message conveys, if used, an associated pilot identification and Walsh code assignment.

The vocoder 53k encodes the voice into a PCM forward traffic data stream. The forward traffic data stream is applied to a convolutional encoder 53l where it is convolutionally encoded and then block interleaved in block 53f. The resulting data stream is combined with the output of a user long code block 53k. The user long code is employed to separate different subscriber channels. The resulting data stream is then power controlled in multiplexer (MUX) 53m, modulo two added to the Walsh code, and then QPSK or BPSK spread across the CDMA FD RF communication channel bandwidth.

The gateway 18 operates to demodulate the CDMA return link(s). There are two different codes for the return link: (a) the zero offset code; and (b) the long code. These are used by the two different types of return link CDMA Channels, namely the access channel and the return traffic channel.

For the access channel the gateway 18 receives and decodes a burst on the access channel that requests access. The access channel message is embodied in a long preamble followed by a relatively small amount of data. The preamble is the user terminal's long PN code. Each user terminal 13 has a unique long PN code generated by a unique time offset into the common PN generator polynomial.

After receiving the access request, the gateway 18 sends a message on the forward link paging channel (blocks 53e, 53i, 53j) acknowledging receipt of the access request and assigning a Walsh code to the user terminal 13 to establish a traffic channel. The gateway 18 also assigns a frequency channel to the user terminal 13. Both the user terminal 13 and the gateway 18 switch to the assigned channel element and begin duplex communications using the assigned Walsh (spreading) code(s).

The return traffic channel is generated in the user terminal 13 by convolutionally encoding the digital data from the local data source or the user terminal vocoder. The data is then block interleaved at predetermined intervals and is applied to a 128-Ary modulator and a data burst randomizer to reduce clashing. The data is then added to the zero offset PN code and transmitted through one or more of the satellites 12 to the gateway 18.

The gateway 18 processes the return link by using, by example, a Fast Hadamard Transform (FHT) to demodulate the 128-Ary Walsh Code and provide the demodulated information to the diversity combiner.

The foregoing has been a description of a presently preferred embodiment of the communication system 10. A description is now made of presently preferred embodiments of the present invention.

The foregoing has been a description of a presently preferred embodiment of the communication system 10. A description is now made of presently preferred embodiments of this invention.

This invention builds upon the invention disclosed in the above-referenced U.S. Pat. No. 5,223,626 to Stephen Ames which is entitled "Repeater Diversity Spread Spectrum Communications System".

In the system described in the Ames patent multiple signals can be concurrently transmitted from multiple independent transmitters and antennas to a single user receiver via multiple satellite repeaters, thus forming multiple forward paths 19a, 17a from a gateway 18 to the user terminal 13. The return paths are likewise defined from the single user terminal 13 to multiple independent gateway antennas and receivers via multiple satellite repeaters.

In the present invention, the transmission of the signals from the multiple independent transmitters and antennas are optimized and selected under the control of the gateway 18, in accordance with information provided by or for the user terminal being served, and also information stored in the gateway 18. The selection of one or more satellite repeaters is based on this information.

The teaching of this invention is primarily directed to the forward link 19a, 17a; i.e., the direction from the gateway 18 to a user terminal 13 via one or more of the satellite repeaters 12. However, the teaching of this invention is also applicable to the return link path 17b, 19b, if directional antenna means are available for the user terminal 13. Both of these embodiments (i.e., forward link and reverse link) are described in detail below.

Figure 6:
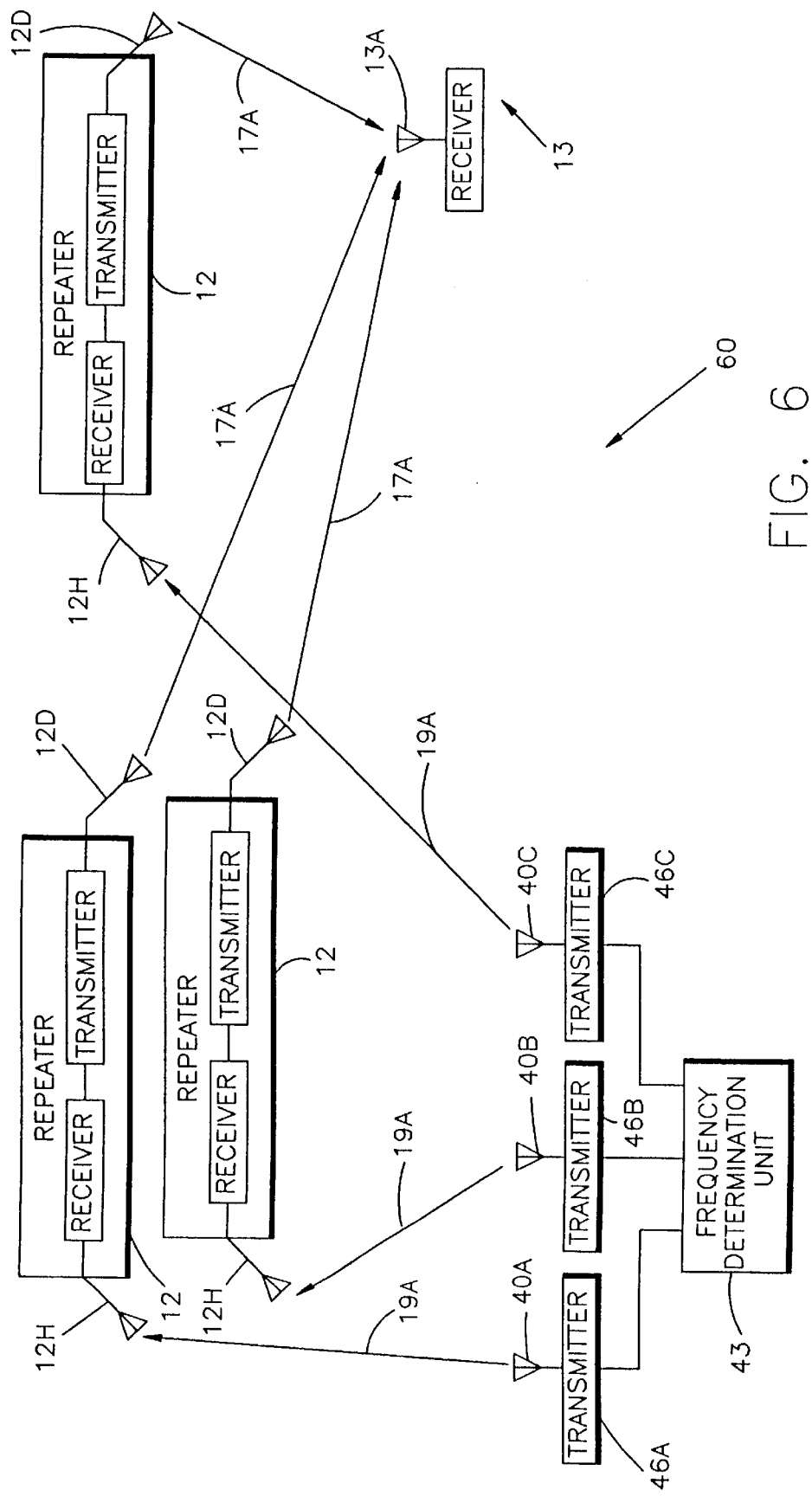
FIG. 6 is block diagram of a forward link path diversity delivery system in accordance with this invention.

Referring now to FIG. 6, there is shown a Path Diversity Delivery System 60 in accordance with this invention. The gateway frequency determination unit 43 sends a single input of traffic signals to one or more of several independent paths and forwards these to one or more transmitters 46a, 46b, 46c which amplifies each signal on the same frequency and delivers the amplified signal to one or more corresponding gateway directional antennas 40a, 40b, 40c for transmission, simultaneously or essentially simultaneously and with the same RF channel frequency, to the satellite repeaters 12. However, with proper signal processing and combining in the user terminal 13 there may be arbitrary delays in transmission. The receive antennas 12h of the selected satellite repeaters receive the uplink (forward path 19a) signals (not necessarily simultaneously) and transmit the signals to the ground via antennas 12d. Although three satellites are depicted as being involved in the transmission of the communication to the user terminal 13, it should be realized that from one to n satellite repeaters 12 can be used, where n is equal to or greater than two.

The selected one or more transmitted signals are received at the user terminal antenna 13a and sent to the receiver for diversity combining. The receiver of the user terminal 13 can be constructed and operated in the manner described in the above-referenced Ames patent, which has been incorporated by reference herein. It is within the scope of this invention to also employ other diversity combining techniques.

Figure 7:
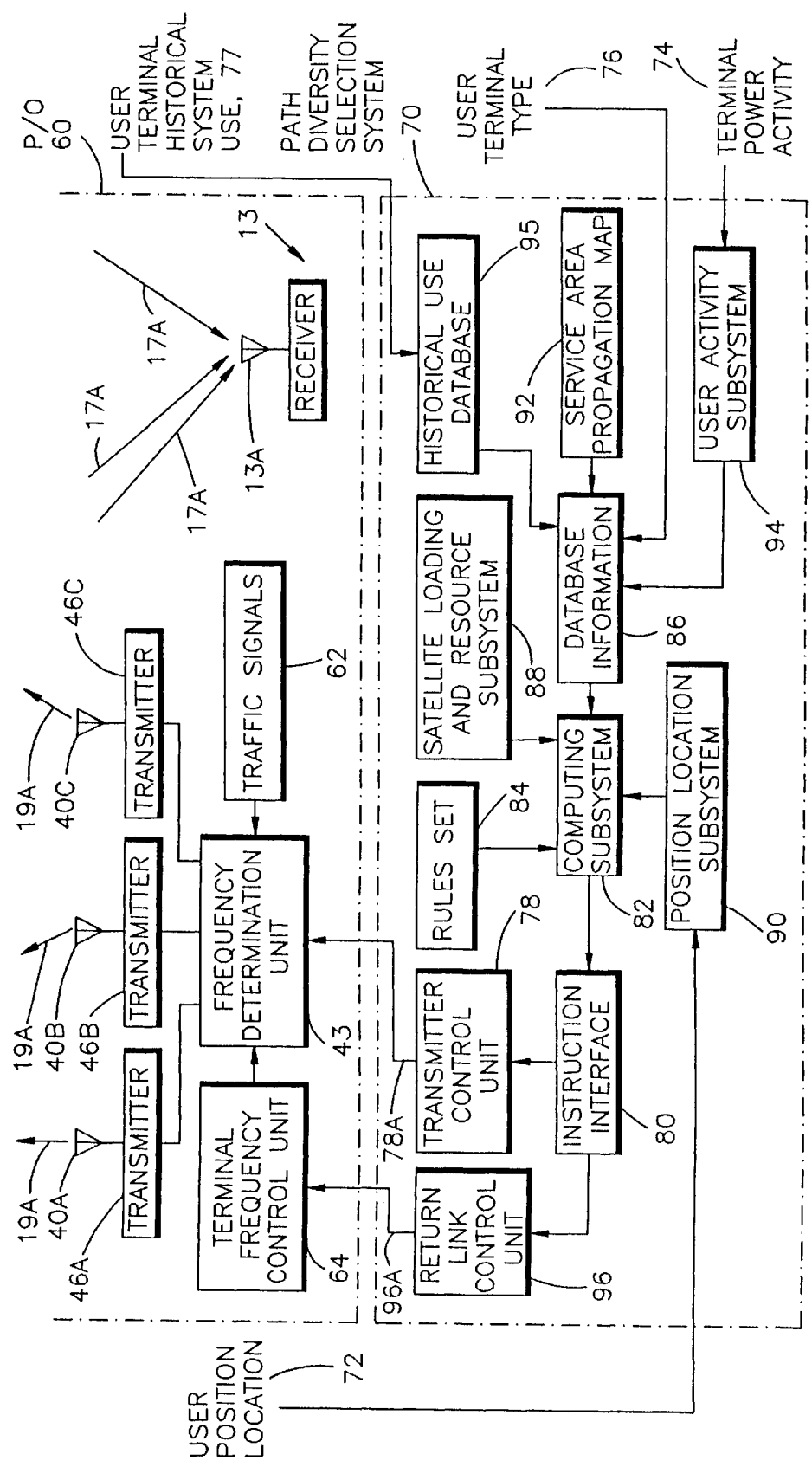
FIG. 7 is a block diagram of a portion of the path diversity delivery system of FIG. 6 in combination with a path diversity selection system in accordance with this invention.

FIG. 7 illustrates a portion of the Path Diversity Delivery System 60 of FIG. 6 and also a Path Diversity Selection System (PDSS) 70 which is constructed and operated in accordance with this invention.

The PDSS 70 receives inputs from external information sources, including a User Terminal Position Location 72, User Power Activity 74, and a User Terminal Type 76. User historical system use data 77 is collected and organized by a user historical database system 95 and stored in a database 86. The historical system use data 77 can, by example, include an environment within which the user terminal 13 is most often used (e.g., urban area, rural area), and can also include a typical or average length of time that the user terminal is employed for making a call or connection. The gateway 18 has access to such information in that it is primarily responsible for managing individual user connections and for gathering billing-related information for individual user terminals.

The PDSS 70 includes a transmitter control unit 78 which issues control instructions 78a to the frequency determination unit 43 of the Path Diversity Delivery System 60. The control instructions 78a specify which transmitter and antenna pair (46a, 40a, etc) to use in directing user traffic signals 62 over specified forward links 19a to selected one of the satellite repeaters 12. The transmitter control unit 78 receives instructions from an instruction interface 80 which is connected to a computing subsystem 82. The computing subsystem 82 determines the number of diversity paths that should be provided, and the type of diversity. The type of diversity may include which satellite repeater or repeaters should be used. The computing subsystem 82 can also determine other control parameters, such as power levels to transmit. The computing subsystem 82 operates according to a rules set or algorithm set 84. The computing subsystem 82 receives inputs from and operates on (a) information stored in the database 86, (b) information provided from a satellite loading and resources availability subsystem 88, (c) the position of the user as provided by a position location subsystem 90, (d) historical system usage by the user, and (e) other sources of user information which may be used to determine a need or lack of need for path diversity. The location of the user terminal 13 is referenced to a service area propagation map 92, also referred to herein as a communications environment map, which may also be stored in the database 86.

The computing subsystem 82, acting on the output of the user terminal position location subsystem 90 and on the data from the service area propagation map 92 which is stored in the database 86, is enabled to determine an environment of the user terminal 13. This user terminal environment information is employed for further processing and decision making with regard to path diversity selection. The user terminal power utilization 74 may be monitored and/or measured by a user activity subsystem 94, and provided to the computing subsystem 82 through the database 86 as described below.

The instruction interface 80 also provides instructions to a return link control unit 96, which in turn provides instructions 96a to a user terminal frequency control unit 64 which forms a part of the Path Diversity Delivery System 60.

In operation, a user terminal 13 logs into the communications system 10 and is assigned to a service area which is under the control of a gateway 18 having the antennas 40a–40c and transmitters 46a–46c that are establishing the diversity of the traffic signals with the user. At log in and/or at other specified times, including at call setup time, a user terminal type is transmitted to the gateway 18 along with the Electronic Serial Number (ESN) of the user terminal 13. The user terminal type information can be transmitted at each telephone call, or the user terminal type information can be stored in, by example, a user information database, in a home location register (HLR), or in a visitor location register (VLR) that is in the gateway 18 or in a terrestrial network that the gateway 18 is connected to. In any case the user terminal type information can be detected and communicated by some means to database information 86. As a result, the user terminal type is known to the gateway 18. For example, and referring again to FIG. 1, there may be vehicle mounted voice terminals 15, hand-held voice terminals 14, hand-held data terminals, paging and messaging hand-held terminals 16, fixed user terminals 14a, or any number of other types of user terminals.

Each of these types of user terminals may have different diversity requirements. For example, a vehicle mounted user terminal 15 which is moving at high speed in a forested area may require diversity from three of the satellites 12 to assure continuity of service, while a hand-held user terminal 14 which is located on a pleasure boat on a lake, or in an open desert area, may not require any diversity.

Since the types of user terminals 13 are known to the gateway 18, diversity can be determined and applied as a group to all terminals of the same type. Alternatively and in a more complex manner, the computing subsystem 82 can dynamically assign diversity to users accessing the satellite system 10 with differing types of user terminals, by issuing instructions to the transmitter control 78 unit via the instruction interface 80.

Further refinements of diversity control may be exercised within each user terminal type group if knowledge is had of the type of terrain within which the user terminal 13 is located. In order to determine the type of terrain that the user is located in it may be necessary to know the location of the user terminal and the environmental characteristics of the user's location.

The user terminal location can be determined in several ways. By example, the user terminal 13 can send to the system 10 the location information by way of an operator-entered code (e.g., 01=urban, 02=rural, 03=water, etc.). Also by example, the user terminal location can be output from a position location subsystem 90, such as GPS, LORAN or some other device which calculates the user's location. Also by example, the system can locate the user terminal by ranging or triangulation using signals from the constellation of satellites 12.

In any case, the user terminal location is assumed to be known to the position location subsystem 90. The user terminal location information, combined with service area propagation map 92 information stored in the database 86, is operated on by the computing subsystem 82 to determine and select the amount or degree of path diversity for a given user terminal. For example, a vehicle mounted terminal 15 traveling in a forested area may need three satellite diversity (as shown in FIG. 6), while the same vehicle mounted terminal 15 traveling in open country such as plains or a desert may be able to achieve the same level of service quality with only one satellite 12 (i.e., no diversity at all). Likewise, a hand-held terminal 14 located in an urban area may require three satellite diversity, while the same type of terminal located on a lake or ocean may require only one satellite 12 to obtain the same connection quality.

The service area propagation map 92 (see, for example, FIG. 10) that is stored in the database 86 can be implemented in various ways, such as with a geographic database. Alternatively, satellite images of the gateway coverage area can determine regions of terrain features based on reflectivity values. Furthermore, it is known that satellite images taken in different spectral bands can be used to locate and identify regions having certain types of vegetation, such as forests. Such images can also be included within the database 86. In this regard seasonal variations in vegetation cover can also be factored into the diversity determination method. By example, a user terminal located within a region identified as having a deciduous forest can be assigned three satellite diversity during the summer months, to compensate for attenuation due to leaves, while the same user terminal in the same forested region in the winter months may be assigned only two satellite diversity.

It is also within the scope of the invention to employ real-time or substantially real-time weather information, such as that provided by Doppler radar, in determining diversity for a given user terminal. By example, and depending upon the RF frequencies in use, user terminals that are known to be located within rain cells within the gateway 18 coverage area, as determined from Doppler radar images of the gateway 18 coverage area, may have their diversity level increased over those terminals not currently located within a rain cell.

In general, known types of computer techniques are employed to develop detailed environmental maps that include vegetation, natural terrain features, suburban and urban development, as well as roads, farmland, industrial areas, and other man-made objects. These image maps, when combined with other database information, such as the user terminal type, provide detailed information on the terminal's environment of reception and/or transmission. The computing subsystem 82, utilizing the rules set 84 and acting on information in the database 86 and the known location of the user terminal from the position location subsystem 90, is enabled to thus provide individual user terminal by individual user terminal instructions to the transmitter control unit 78 so as to control the number of gateway antenna/transmitter pairs that send a traffic signal transmission (19a, 17a) to the user terminal receiver via the selected number of satellite repeaters 12.

A further refinement of path diversity control is implemented by a knowledge of the historical use of power by the user terminals 13. For example, in most mobile communications systems using satellites the individual traffic signals of the user terminal are actively power controlled such that sufficient margin to overcome shadowing and blocking is provided on a link-by-link basis. Such power control loops operate on both the forward and return links, and may be open or closed loops. In any case, the power control loops may be monitored and data recovered by the gateway 18 that is used to determine the historical utilization of power, and therefore, the user terminal environment. It is possible to determine, in a general manner, the type of blocking or shadowing that is being experienced. For example, a link which is blocked (has an extremely deep fade) for a hand-held terminal 14 for minutes at a time can be deduced to be caused by a building or some other Radio Frequency (RF) opaque object.

On the other hand, a rapidly varying sequence of fades from substantially zero to deep fading may signify a vehicle moving through a heavily treed environment. This historical power control-related data is used to make decisions relative to the delivery of path diversity. Likewise, certain users may historically use more power per call than others, leading to a desire to either provide, or deprive, that user terminal of diversity according to need. This historical power control data may be of a long term or short term average nature.

The methods for selecting path diversity described above may be used separately, or combined in multiple ways, and may be dynamically or semi-dynamically assigned. For example, user terminals 13 may be selected initially to be supplied with "all satellite available" diversity equally, effectively bypassing the path diversity selection system 70 altogether. Alternatively, upon instructions from the satellite loading and resource subsystem 88, the computing subsystem 82, under control of the rules set 84, may determine that selective path diversity is required in order to conserve power or manage the FDM frequency allocation of the satellites 12. The computing subsystem 82, under the control of the rules set 84, then decides on a link-by-link basis, or alternatively on a user terminal group basis, which path diversity mode to operate in. The various modes and refinements of path diversity control, as described above, can be utilized either singularly or in any combinations, as necessary to achieve the goals of the instructions of the satellite loading and resource subsystem 88.

As such, it is a feature of this invention that the user terminals 13 are actively diversity controlled much in the same manner as the user terminals are power controlled, via an open or closed loop path diversity control loop, which is used to deliver near instantaneous changes in link diversity in response to received information.

The capacity of satellite communication systems is generally limited by both the bandwidth and the power available in the satellites. The bandwidth utilization and power availability depend in part on the diversity provided to the user terminals 13 on the system. While the discussion above generally pertains to the improvement of the reception of signals by the user terminals 13, the opposite effect can also be achieved by the invention described herein. For example, the path diversity control of individual user terminals 13, sub-groups of user terminals 13, or entire groups of user terminals 13 may be employed to dynamically increase the capacity of the system and/or to affect the power utilization of the system. The instructions from the satellite loading and resource subsystem 88, acted on by the rules set 84 in the computing subsystem 82, may also be used to control the utilization of individual ones of the satellite resources.

Figure 8:
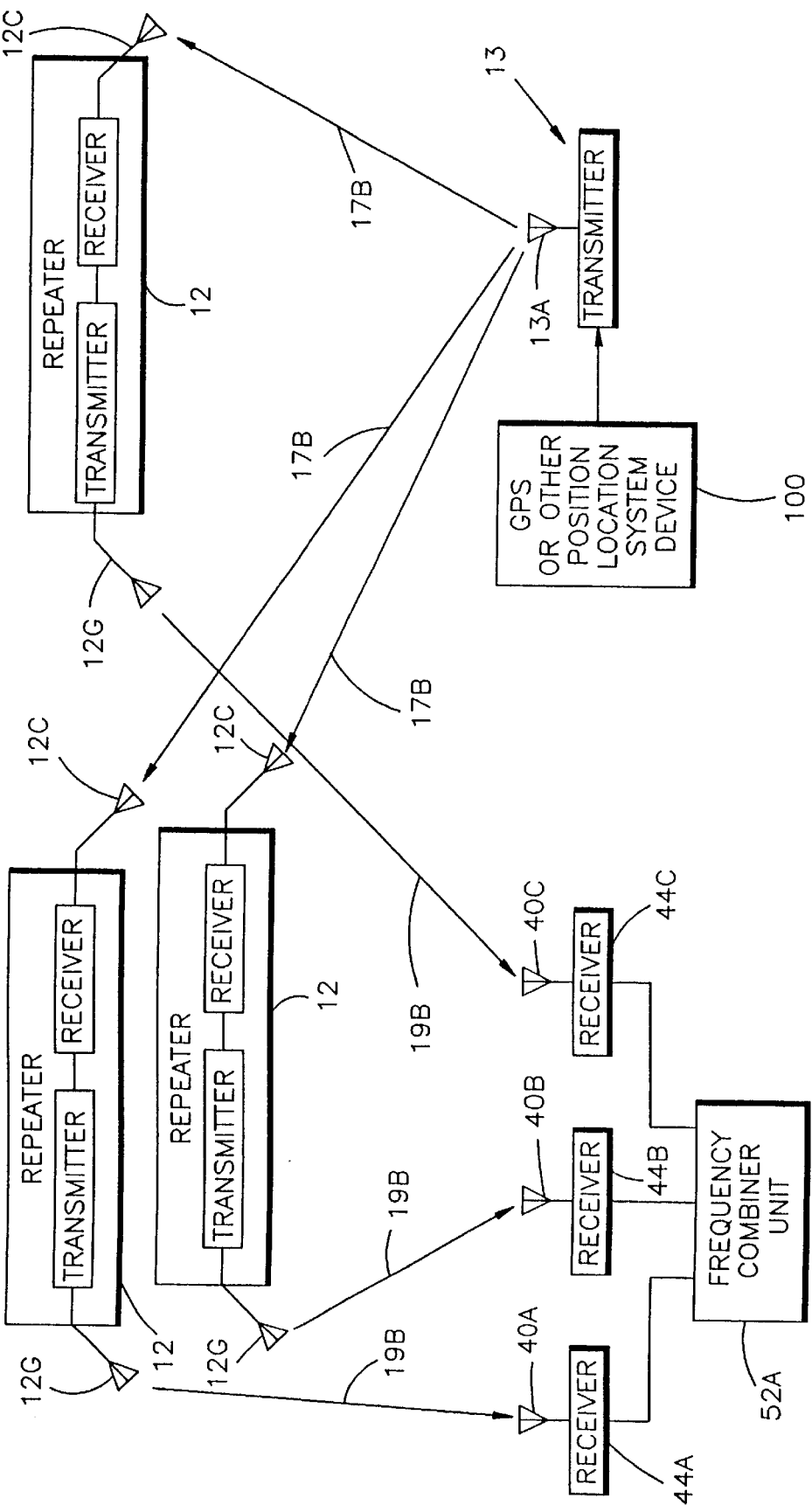
FIG. 8 is a block diagram illustrating the reverse link from user terminal to gateway.

The discussion thus far has generally treated the forward link, i.e., the communication path from the gateway 18 to a user terminal 13, via one or more of the satellite repeaters 12. The ensuing discussion will pertain, instead, to the reverse or return link. The return link is defined as follows and is shown in FIG. 8. A user terminal 13 takes a single input and forwards this to a transmitter which amplifies the signal and delivers the amplified signal to its antenna 13a for transmission simultaneously on the same frequency to the satellite repeaters 12. The satellite repeaters receive antennas 12c receive the signals, not necessarily simultaneously, and transmit the signals to the ground via transmit antennas 12g (see also FIG. 3A). The transmitted signals are received at the gateway 18 by three independent receive antennas 40a–40c and sent to their respective receivers 44a–44c. The received signals may then be processed and combined as described in, by example, U.S. Pat. No. 5,233,626, which has been incorporated by reference herein.

The return link may be used for determining the user terminal power activity 74 (FIG. 7), although the forward link power control activity may be used for this purpose as well. The return link may also be used to transmit the user terminal type 76 (FIG. 7), although this information may be derived from a database of inactive or active users on the system, such as by correlating the user terminal's Electronic Serial Number (ESN) with an associated and predetermined user terminal type. The return link may also be used to transmit the user position location 72 (FIG. 7) for use in making diversity decisions by the computing subsystem 82. In this case the user terminal 13 transmits a signal on this return link bearing information which may be used by the gateway 18 to determine the location of the user terminal 13. Alternatively, the user terminal 13 can transmit its location by the use of some code. In another embodiment of this invention any of the well-known types of radio location systems (such as the various GPS position location devices) may be used to determine the location of the user terminal 13, after which the user terminal location information 72 is transmitted over the return link to the gateway 18 and thence to the position location subsystem 90 (FIG. 7).

As mentioned previously, the return link may also have path diversity selectivity in accordance with the teachings of this invention, so long as the user terminal 13 has the ability to simultaneously direct its signals to one or more of the satellite repeaters 12. In this case, the operation of the system involves cooperation of the gateway 18 and the user terminal 13 in the following manner.

As was described in detail above, the user terminal type 76, the user position location 72, and the user terminal power activity 74 are determined and processed by the computing subsystem 82 and instructions are issued to the instruction interface 80. The instruction interface 80 decodes the instructions and generates suitable control signals for the transmitter control unit 78 and the return link control unit 96. In this case the control signal generated for the return link control unit 96 causes a signal 96a to be formatted and delivered to the terminal frequency control unit 64 of the diversity path delivery system 60. The terminal frequency control unit 64 in turn generates a control signal containing the information that is necessary to control the antenna/amplifier combination at the user terminal 13. This signal is sent to the user terminal 13 receiver over the forward link.

Figure 9:
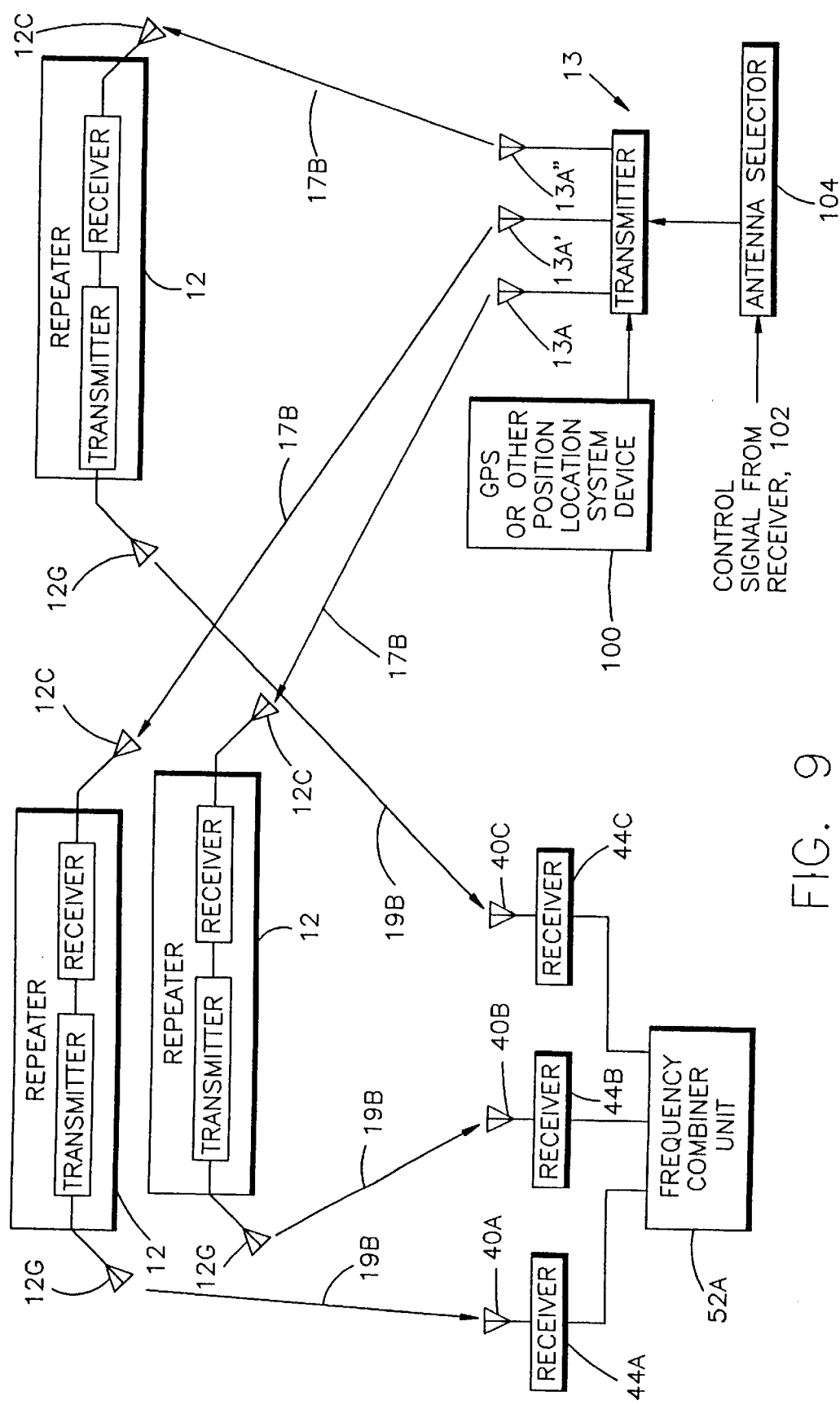
FIG. 9 is a block diagram of a path diversity return link embodiment of this invention.

As is shown in FIG. 9, the control signal 102 is received at the user terminal 13 and is routed to an antenna selector 104 which then controls the antennas 13a, 13a", 13a"", etc., to achieve the desired results. That is, in this embodiment control over the user terminal 13 antennas 13a–13a"", and hence control over the return link path diversity, is accomplished by remote control from the gateway 18, using the forward link as a control link.

Figure 10:
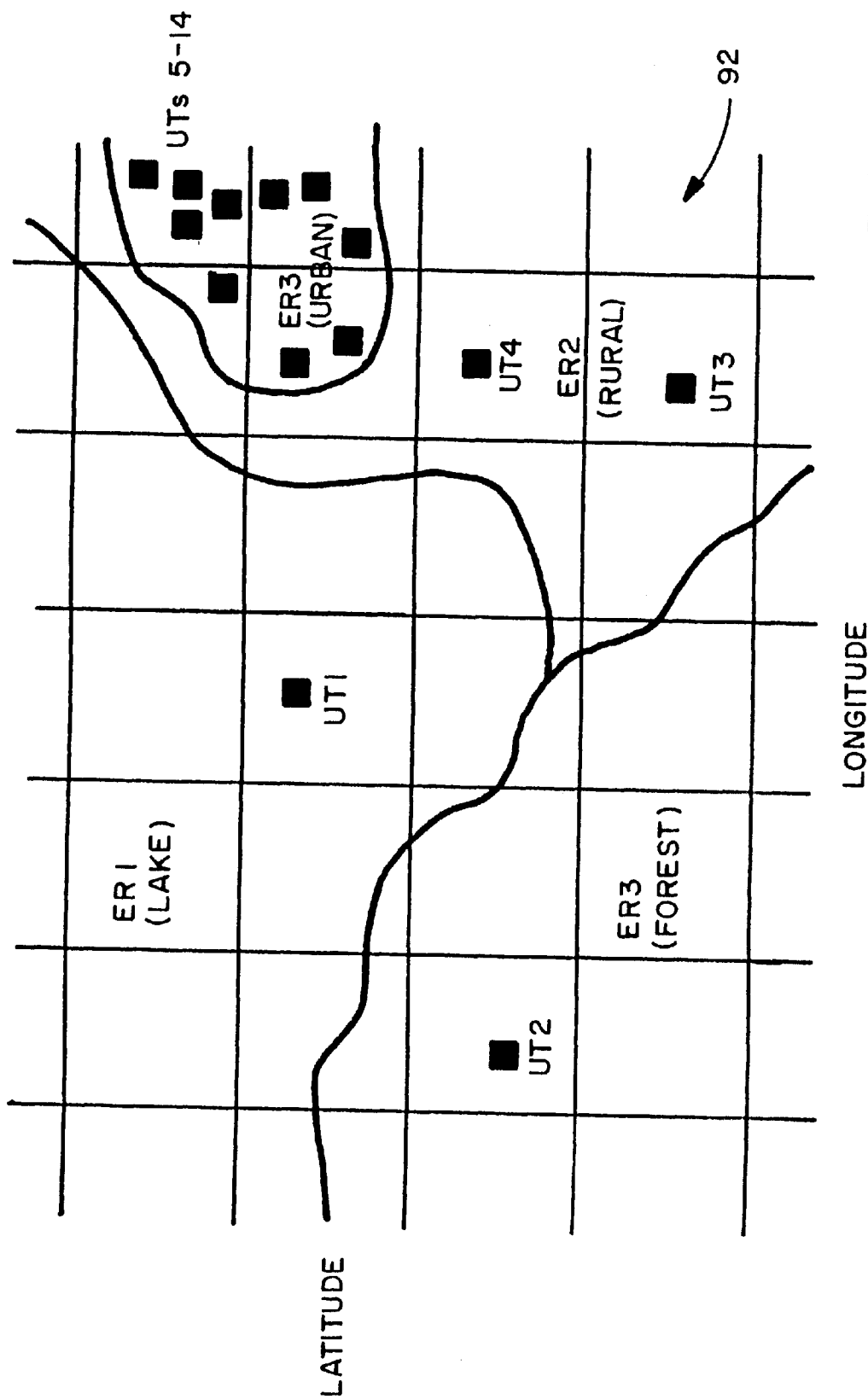
FIG. 10 illustrates an exemplary communications environment map that is a feature of this invention.

Reference is now made to FIG. 10 for showing a portion of an exemplary service area propagation, or communications environment, map 92. In this exemplary digitized map, which may be derived from satellite images of the gateway service area, there is located a lake region, a forest region, a rural region, and an urban region. These different regions may be classified into three general types of Environmental Regions (ERs) in accordance with a level of path diversity that is anticipated to provide a stationary user terminal 13 with an adequate and acceptable link quality. By example, the lake region is designated as ER1, which corresponds to no diversity (i.e., one satellite repeater). The rural area is designated as ER2, which corresponds to an intermediate level of path diversity. The forest region and the urban region are both designated as ER3, which may correspond to a maximum available path diversity level (i.e., the communication link is established through as many satellites 12 as is possible, depending on system loading and other criteria).

Plotted on the map 92 are the current locations of 14 active user terminals (UT1–UT14). Assuming as a simplest case that three satellite repeaters 12 are currently serving this area, that all of the user terminals 13 are of the same type, and that other factors such as historical power control information, season variations, local weather conditions, etc. are not considered, then UT1 is assigned one of the satellite repeaters 12, UT3 and UT4 are assigned two of the satellite repeaters 12, and UT2 and UTs 5–14 are each assigned three of the satellite repeaters 12. It can thus be appreciated that by not automatically assigning the maximum available path diversity to user terminals UT1, UT3 and UT4, a considerable savings in satellite power consumption is realized, as is a conservation of the number of required RF channels and a general increase in total system capacity.

Further in accordance with the invention the relatively static system profile described thus far can be extended to the more typical dynamic case, while still optimizing the path diversity delivered to the user terminals 13. For example, if UT2 is a mobile, vehicle mounted terminal 15, then by detecting that the location of UT2 has changed from ER3 to ER2 the assigned path diversity can be changed in real time or substantially real time from three satellites to two, while still maintaining the same user-perceived link quality. Conversely, if the location of UT4 changes from ER2 to ER3 the assigned path diversity can be changed from two satellites to three. Furthermore, if it is known that several of the UTs 5–14 are. fixed user terminals 14a, which are assumed to have antennas that are located in a region free of signal-blocking obstructions, then these user terminals can be assigned but a single satellite, although they are located within an ER3 portion of the gateway 18 service area. Also by example, the forested region can be designated as an ER3 region during the months of May through October, and designated as an ER2 region during the months of November through April.

The rules set 84 of FIG. 7 determines the path diversity level for the user terminals UT1–UT14 as described previously. The rules set 84 can be implemented as a set of IF-THEN-ELSE type of logical statements. By example, the following is but one suitable embodiment for a portion of the rules set 84 in determining a Diversity Level (DL) for user terminals 13.

IF TYPE of $UT_j$=HANDHELD and
   IF LOCATION of $UT_j$=ER1
     THEN DL=MINIMUM
   ELSE IF LOCATION of $UT_j$=ER2
     THEN DL=INTERMEBIATE
   ELSE IF LOCATION of $UT_j$=ER3
     THEN DL=MAXIMUM
ELSE
   IF TYPE of $UT_j$=FIXED
     THEN DL=MINIMUM
ELSE
IF TYPE of $UT_j$=DATA TERMINAL and
   IF LOCATION of $UT_j$=ER1
     THEN DL=INTERMEDIATE
   ELSE IF LOCATION of $UT_j$=ER2 OR ER3
     THEN DL=MAXIMUM
etc . . .

The data terminal type of user terminal 13 illustrates the utility of the invention in assigning a diversity level based on both terminal type and location. By example, it may be desirable to automatically assign higher diversity to a user terminal that is identified as a data terminal, or to a voice terminal that is identified as being involved in a data transmission, so as to provide additional margin to avoid an erroneous data transmission.

As described previously, other criteria can be considered in the rules set 84 when determining a diversity level, such as historical power control information, the historical usage data 77, local weather conditions, and any other factors that are related to or that can influence the link quality.

It should be noted that determined level of diversity for a given user terminal may differ from the actual diversity level delivered to the user terminal. By example, if only two satellites 12 are currently in view of the gateway service area then the minimum diversity level may be one satellite while the intermediate and maximum diversity levels may both be set at two satellites. Further, even if only one satellite is in view of the user terminal 13, the gateway 18 and user terminal 13 may be able to utilize signals from two overlapping means. Since the geometry of the satellites is known, this invention can control and employ transmissions to more than one beam. Also by example, during periods of high user demand, and assuming that three satellites are currently serving the gateway service area, the intermediate and maximum diversity levels may still both be set at two satellites. The translation of determined diversity level into an actual diversity assignment for a given user terminal 13 or class of user terminals is accomplished by the computing subsection 82, in cooperation with the satellite loading and resource subsystem 88.

Figure 11:
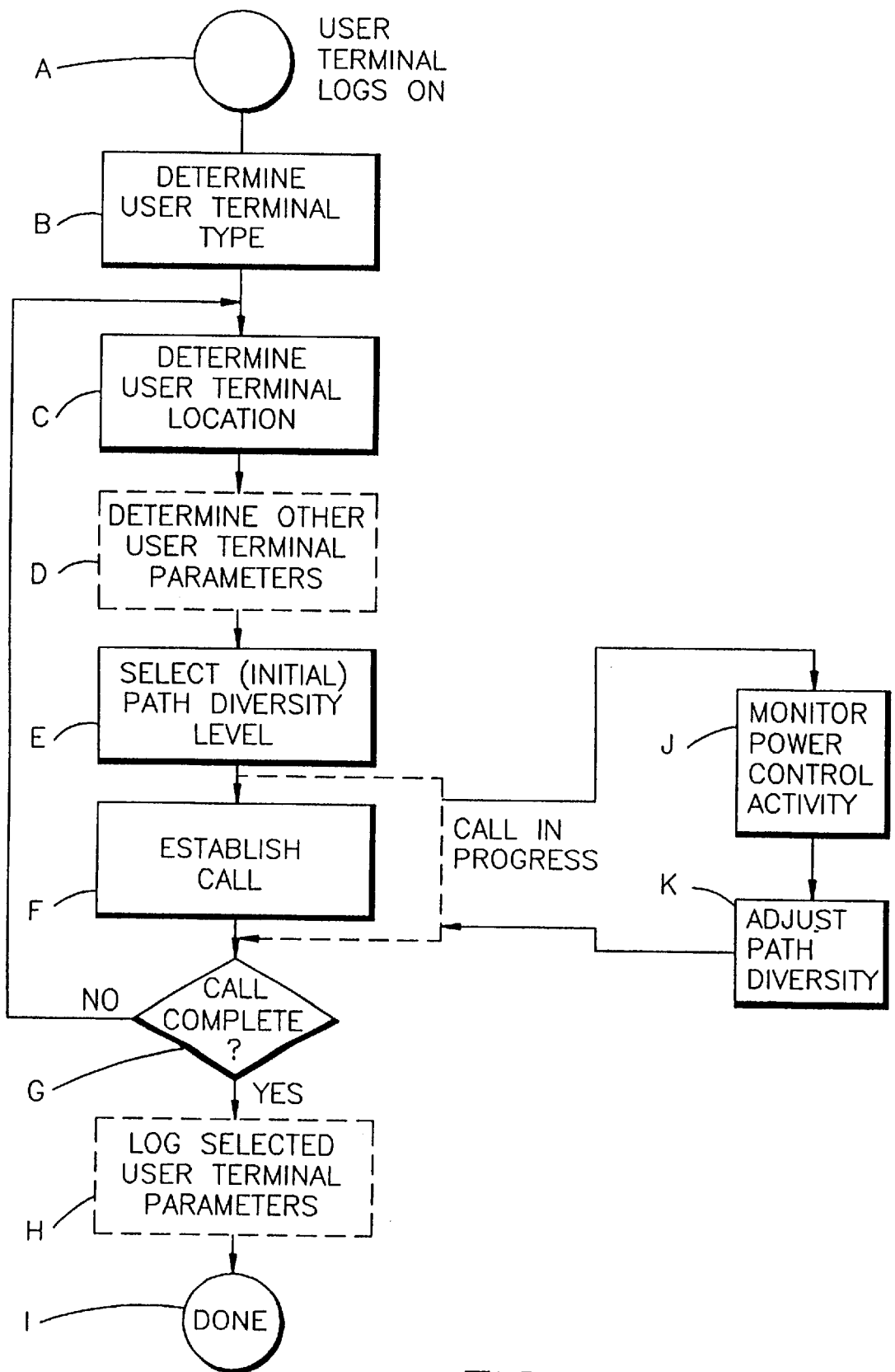
FIG. 11 is flow chart illustrating a method of this invention.

FIG. 11 is flow chart of a method of this invention. At block A a user terminal 13 logs on or, if already logged on, initiates a call or is called. At block B the user terminal type 76 is determined, and at block C the location 72 of the user terminal is determined. At optional block D other user terminal parameters are determined, such as historical power control information 74, historical usage 77, weather conditions at the determined location of the user terminal, etc. At block E the computing subsystem 82 determines, via the database 86 and position location subsystem 90, the diversity level for the user terminal 13. The diversity level is determined in cooperation with the rules set 84, the user position location 72, the user terminal type 76, optional user terminal related information, such as the terminal power activity 74, the service area propagation map 92, and in accordance with the satellite loading and resource system 88. At block F the call is established with a selected diversity level via the instruction interface 80, the transmitter control unit 78, path diversity delivery system 60 and, optionally, through the return link control unit 96 and terminal frequency control unit 64. At block J the system senses and reports increased/decreased power control activity and, after a suitable delay, at block K increases or decreases the path diversity accordingly. At block G a determination is made if the call is completed. If NO, control returns to block C, for a user terminal type that is capable of movement, to update the user terminal position and to modify the path diversity level (block E) if appropriate. If YES at block G an optional step (block H) is executed to store or log selected user terminal parameters, such as the terminal power activity, last location of the user terminal, etc. At block I the method terminates for this user terminal.

It can be appreciated that the teaching of this invention provides a number of significant advantages to any type of communication system that employs diversity combining through intermediate signal repeaters. That is, the teaching of this invention is not limited for use only with the SS-CDMA type of LEO satellite communication system 10 that is shown generally in FIGS. 1–5. Instead, the teaching of this invention is applicable to other types of communications systems that use, by example, terrestrial repeaters either alone or in combination with satellite (LEO or geosynchronous) repeaters. The teaching of this invention is also applicable to other access types, such as TDMA, that use diversity in some manner.

Thus, while the invention has been particularly shown and described with respect to preferred embodiments thereof, it will be understood by those skilled in the art that changes in form and details may be made therein without departing from the scope and spirit of the invention.

What is claimed is:

1. A communications system, comprising:
    a plurality of communication signal repeaters;
    a communication signal transmitter having a plurality of antennas for selectively transmitting a communication signal to individual ones of said communication signal repeaters;
    a communication signal receiver for receiving a communication signal from said communication signal transmitter through at least one of said communication signal repeaters, said communication signal receiver being one of a plurality of types of communication signal receiver, said plurality of types comprising at least a fixed communication signal receiver and a mobile communication signal receiver; and
    control means, responsive to information specifying at least what type said communication signal receiver is, for specifying a number of said communication signal repeaters to be used in repeating a communication signal that is transmitted from said communication signal transmitter to said communication signal receiver.

2. A communication system as set forth in claim 1 wherein said control means is further responsive to information that specifies a location of said communication signal receiver for specifying the number of said communication signal repeaters to be used in repeating the communication signal that is transmitted from said communication signal transmitter to said communication signal receiver.

3. A communication system as set forth in claim 1 wherein said control means is further responsive to information that specifies an RF propagation environment of said communication signal receiver for specifying the number of said communication signal repeaters to be used in repeating the communication signal that is transmitted from said communication signal transmitter to said communication signal receiver.

4. A communication system as set forth in claim 1 wherein said control means is further responsive to information that specifies a historical usage of the system by the communication signal receiver for specifying the number of said communication signal repeaters to be used in repeating the communication signal that is transmitted from said communication signal transmitter to said communication signal receiver.

5. A communication system as set forth in claim 1 wherein said communication signal receiver is a component of a transceiver having a transmitter that is remotely power controlled, and wherein said control means is further responsive to information specifying a power control history for said transmitter of said transceiver for specifying the number of said communication signal repeaters to be used in repeating the communication signal that is transmitted from said communication signal transmitter to said communication signal receiver.

6. A system as set forth in claim 2 wherein the information specifying a location of said communication signal receiver includes information that specifies an RF energy propagation characteristic that is associated with an environment within which the communications signal receiver is located.

7. A system as set forth in claim 1 wherein said plurality of communication signal repeaters are comprised of a plurality of earth orbiting satellites.

8. A system as set forth in claim 7 wherein said plurality of earth orbiting satellites form a portion of a constellation of low earth orbit (LEO) satellites.

9. A communication system as set forth in claim 7 wherein said control means is further responsive to information that specifies a current availability of said plurality of earth orbiting satellites for specifying the number of said communication signal repeaters to be used in repeating the communication signal that is transmitted from said communication signal transmitter to said communication signal receiver.

10. A method of operating a satellite communication system, comprising the steps of:
    initiating a communication between a user terminal and a ground station via at least one satellite communication signal repeater;
    classifying the user terminal as to a type of user terminal, wherein types of user terminals comprise at least a fixed user terminal and a mobile user terminal; and
    selecting a number of satellite communication signal repeaters to relay the communication between the user terminal and the ground station, the selected number being a function of at least the type of the user terminal.

11. A method as set forth in claim 10 wherein the step of selecting further includes a step of determining a location of the user terminal within an area serviced by the ground station.

12. A method as set forth in claim 11 wherein the step of selecting includes a step of determining an RF energy propagation characteristic that is associated with the determined location of the user terminal.

13. A method as set forth in claim 10 wherein the step of selecting includes a step of considering a power control history of the user terminal.

14. A method as set forth in claim 10 wherein the step of selecting includes a step of considering a system usage history of the user terminal.

15. A method as set forth in claim 10 wherein the step of selecting includes a step of considering an availability of satellite communication signal repeaters.

16. A method as set forth in claim 10 wherein the communication is bidirectionally relayed as a spread spectrum, code division multiple access communication signal between the user terminal and the ground station.

17. A method as set forth in claim 10 and further comprising the steps of:
    receiving the communication with the user terminal, the communication being received through different communication paths associated with individual ones of the selected number of satellite communication signal repeaters;
    equalizing at least the phase shifts and delays of the received communication from each of the different paths to provide a plurality of equalized communication signals; and
    combining the equalized communication signals into a composite received communication signal.

18. A satellite communication system, comprising:
    a plurality of communication satellites;
    a ground station having a transceiver for transmitting and receiving communication signals with said plurality of communication satellites;

a user terminal having a transceiver for transmitting and receiving communication signals with said plurality of communication satellites;

said ground station further having a data base of user terminal-related information including information specifying a type of said user terminal, wherein said type is selected from the group consisting of a fixed user terminal and a mobile user terminal, said data base further storing information that is descriptive of an RF propagation characteristic of a region within a service area of said ground station;

said ground station further having control means that is coupled to said data base and to a rules set for determining a number of said plurality of communication satellites for relaying a communication between said user terminal and said ground station, said ground station including means for determining a location of said user terminal, and wherein said control means determines the number of communication satellites in accordance with said user terminal type, said location of said user terminal, and an RF propagation characteristic that is associated with said location of said user terminal.

19. A satellite communication system as set forth in claim 18, wherein said data base further stores information that is descriptive of user terminal historical power control activity.

20. A satellite communication system as set forth in claim 18, wherein said data base further stores information that is descriptive of user terminal historical system usage.

21. A satellite communication system as set forth in claim 18, wherein said plurality of communication satellites comprise a Walker constellation of low earth orbit satellites, and wherein communications are bidirectionally transmitted as spread spectrum, code division multiple access communication signals between a user terminal's transceiver and the ground station's transceiver, through at least one of said plurality of communication satellites.

22. A method of operating a satellite communication system, comprising the steps of:

initiating a communication between a user terminal and a ground station via at least one satellite communication signal repeater;

determining, at the ground station, a location of the user terminal within an area serviced by the ground station;

selecting a number of satellite communication signal repeaters to relay the communication between the user terminal and the ground station, the selected number being a function of at least the determined location of the user terminal and also stored information describing a communication signal propagation environment at the determined location of the user terminal, the selected number of satellite communication signal repeaters being a number that provides at least a minimum communications quality while using a minimum amount of system resources; and repeating the step of selecting, if required, during a time that the communication is established so as to continue to provide at least the minimum communications quality while using a minimum amount of system resources.

* * * * *